United States Patent Office

3,441,371
ZIRCONIUM HEXAFLUOROGERMANATE [Zr(GeF$_6$)$_2$] AND ZIRCONYL HEXAFLUOROGERMANATE [ZrOGeF$_6$]

Joseph C. Muhler, Indianapolis, Ind., assignor to Indiana University Foundation, Bloomington, Ind., a corporation of Indiana
No Drawing. Filed May 3, 1966, Ser. No. 547,188
Int. Cl. C01g 25/04; A61k 7/16
U.S. Cl. 23—51                        3 Claims

ABSTRACT OF THE DISCLOSURE

New compositions of matter, namely, zirconium hexafluorogermanate [Zr(GeF$_6$)$_2$] and zirconyl hexafluorogermanate [ZrOGeF$_6$], have been discovered. These compounds, when incorporated in oral compositions for dental caries prophylaxis (e.g., as constituents of a dentifrice, prophylaxis paste, or mouthwash), have demonstrated substantial utility as anticariogenic agents.

---

This invention relates to new compositions of matter, and more particularly to salts comprising zirconium, germanium, and fluoride ions and to uses thereof as topically effective anticariogenic agents.

It is commonly recognized that the presence of small amounts of fluoride in drinking water (e.g., 1.0 microgram fluoride per milliliter) has a pronounced effect in reducing the incidence of dental caries in permanent teeth of children consuming such water from birth through eight years of age. Soluble fluoride salts have been introduced into public water supplies in a number of communities with good result. This medium for providing fluoride is not feasible, however, where drinking water is obtained from small, private fluoride-deficient sources such as individual wells, etc., rather than from fluoridated (naturally or fortified) common public sources. Further, the addition of fluoride to common public water sources is not always accepted or permitted nor is it completely effective. Moreover, much benefit is derived from the use of topical anticariogenic materials even in fluoridated areas.

Topical application of aqueous fluoride solutions by dentists or dental hygienists provides an excellent measure of protection against caries. Various fluoride compounds have been employed in this manner, including sodium fluoride, stannous fluoride, and stannous fluorozirconate (SnZrF$_6$), which is the subject of applicant's copending United States patent application, Stannous Fluorozirconate and Compositions for Caries Prophylaxis Containing Same, Ser. No. 291,173, filed June 27, 1963. Another method of utilizing the anticariogenic properties of fluoride salts comprises incorporating such fluoride salts with a compatible abrasive (such as lava pumice or zirconium silicate) to form a prophylactic paste composition for use by dentists or dental hygienists in periodic cleaning and polishing of the teeth, as set forth and described in applicant's copending United States patent application, Prophylactic Dental Paste Compositions Comprising Zirconium Silicate, Ser. No. 314,602, filed Oct. 8, 1963.

Limitations on the availability and effectiveness of fluoride prophylaxis by way of water supplies have also led to extensive efforts to incorporate various fluoride salts in oral compositions such as dentifrices, mouthwashes, and the like for use in the home. Again, various fluoride compounds have been employed in this manner, especially stannous fluoride.

Although effective caries protection has been obtained through the use of the aforementioned fluoride compounds in compositions adapted for topical application to teeth, occasional side effects have been experienced with certain of the known anticariogenic agents, particularly certain tin-containing salts. For this reason, dental researchers have continued their efforts to find new compositions which are not only anticariogenically more effective, but which also reduce undesirable side effects.

Accordingly, it is a primary object of the present invention to provide new anticariogenic compounds comprised of zirconium, germanium, and fluorine which exhibit a high level of anticariogenic effectiveness and which are relatively non-toxic to living organisms.

It is a related object of the present invention to provide compositions which contain the said anticariogenic compounds and which are adapted for topical use in preventive dentistry.

A further object is to provide anticariogenic compounds of the character described which can be used at very high concentrations relative to known anticariogenic fluoride-containing compounds.

Yet another object of the present invention is to provide an improved method of reducing the solubility of dental enamel which comprises the topical application thereto of compositions containing the said anticariogenic compounds.

These and other objects, advantages, and features of the subject invention will hereinafter appear, and, for purposes of illustration, but not of limitation, various exemplary embodiments of the subject invention are hereinafter described in detail.

In accordance with the subject invention, new salts comprising zirconium, germanium, and fluoride ions have been discovered. Specifically, these salts are zirconium hexafluorogermanate [Zr(GeF$_6$)$_2$] and zirconyl hexafluorogermanate [ZrOGeF$_6$]. It has been further found that these new compounds are highly effective as anticariogenic agents when utilized topically (i.e., in local applications to the teeth) either alone or in combination with other materials, as hereinafter described.

PREPARATION AND PROPERTIES

Zirconium hexafluorogermanate [Zr(GeF$_6$)$_2$] is a bluish-white, crystalline compound which melts at a temperature in excess of 310° C. and which has a refractive index of 1.565–1.572. Zr(GeF$_6$)$_2$ can be prepared by dissolving zirconium tetrafluoride [ZrF$_4$] and germanium dioxide [GeO$_2$] in a molar ratio of 1:2 in a 50 percent aqueous hydrofluoric acid [HF] solution. This solution is evaporated, and the crystals are collected. The crystals are then washed with 50 percent hydrofluoric acid and are dried.

Example I 4.181 g. (0.025 mole) of anhydrous ZrF$_4$ and 5.23 g. (0.05 mole) of GeO$_2$ were dissolved in 25.392 ml. of 50 percent aqueous hydrofluoric HF solution, and the Zr(GeF$_6$)$_2$ crystals were collected in accordance with the method above indicated. Zr(GeF$_6$)$_2$ synthesized in this manner was obtained in an 88 percent yield. Theoretical and actual chemical analyses of this product conformed to the values reported in Table I.

TABLE I.—ANALYSES

| Element | Theoretical (percent) | Actual (percent) |
|---|---|---|
| Fluorine | 49.09 | 49.0 |
| Germanium | 31.27 | 31.3 |
| Zirconium | 19.64 | 19.7 |

Zirconyl hexafluorogermanate [ZrOGeF$_6$] is a graywhite crystalline compound which melts at a temperature in excess of 310° C. and which has a refractive index of 1.558. ZrOGeF$_6$ can be prepared in the following manner. One mole of GeO$_2$ and two moles of potassium fluoride [KF] are dissolved in an excess of 50 percent HF solution. The resulting solution is neutralized with 50 percent potassium hydroxide [KOH], thereby precipitating potassium hexafluorogermanate [$K_2GeF_6$], which is collected. An equimolar mixture of $K_2GeF_6$ and zirconium oxychloride [$ZrOCl_2$] is dissolved in a minimal amount of water, and the resulting solution evaporated. The precipitate, which is $ZrOGeF_6$, is collected and dried.

Example II 5.230 g. (0.050 mole) of $GeO_2$ and 2.905 g. (0.05 mole) of KF were dissolved in 25.392 ml. of 50 percent HF solution. Upon neutralization of the resulting solution with 50 percent KOH, a precipitate of $K_2GeF_6$ separated and was collected, the yield thereof being 98 percent.

6.620 g. (0.025 mole) of the $K_2GeF_6$ so prepared was dissolved in a minimal amount of water with 8.057 g. (0.025 mole) of $ZrOCl_2$. The product was isolated in accordance with the foregoing method, and $ZrOGeF_6$ was obtained in a 92 percent yield. Theoretical and actual chemical analyses of this product conformed to the values reported in Table II.

TABLE II.—ANALYSES

| Element | Theoretical (percent) | Actual (percent) |
|---|---|---|
| Fluorine | 38.80 | 38.7 |
| Germanium | 24.71 | 24.8 |
| Oxygen | 5.45 | 5.5 |
| Zirconium | 31.05 | 31.0 |

The presently disclosed zirconium-germanium-fluoride salts have each been characterized according to the conventional Hull-Debye-Scherrer X-ray diffraction powder technique in order to produce a film record. Exposure was made using a standard X-ray diffraction camera (diameter 114.6 mm.) for 4.0 hours at 35 kv. and 18 ma. with a copper target and a nickel filter. As is known to one skilled in the art, this technique causes all chemical compounds to refract X-rays according to a pattern specific for each compound. The X-rays expose a film according to a specific pattern, which appears on the film as characteristic lines, the inter-planar spacing of which and the relative intensity of which may be measured in order to identify the compound. Table III records measurements obtained from a film record when each of the zirconium-germanium-fluoride salts was treated as described, and for comparative purposes corresponding values obtained with $ZrF_4$; $GeO_2$ (hexagonal); $GeO_2$ (tetragonal); and $ZrOCl_2$ have also been included. The values under "d" are the interplanar distances expressed in angstroms, and the values given under I represent the relative intensities of the lines obtained by arbitrarily assigning a value of 100 to the most intense line. The data presented in Table III show that the X-ray diffraction pattern for the novel zirconium-germanium-fluoride salts herein disclosed are distinctive and are readily distinguishable from the patterns of the other materials evaluated and from the patterns of each other.

TABLE III.—X-RAY DIFFRACTION DATA[1]

| $Zr(GeF_6)_2$ | | $ZrOGeF_6$ | | $ZrF_4$ | | | | $GeO_2$(hex) | | $GeO_2$(tetra) | | $ZrOCl_2.8H_2O$ | |
|---|---|---|---|---|---|---|---|---|---|---|---|---|---|
| d | I | d | I | d | I | d | I | d | I | d | I | d | I |
| 6.41 | 100 | 6.41 | 100 | 6.88 | 25 | 1.92 | 40 | 4.32 | 21 | 3.118 | 100 | 12.8 | 100 |
| 3.97 | 100 | 4.33 | 8 | 6.09 | 20 | 1.91 | 20 | 3.429 | 100 | 2.3999 | 60 | 10.6 | 27 |
| 3.85 | 31 | 3.97 | 100 | 4.95 | 6 | 1.87 | 20 | 2.496 | 11 | 2.199 | 15 | 7.9 | 20 |
| 3.46 | 70 | 3.85 | 35 | 4.75 | 30 | 1.85 | 20 | 2.366 | 22 | 2.106 | 13 | 6.9 | 63 |
| 3.30 | 95 | 3.46 | 75 | 3.87 | 100 | 1.83 | 20 | 2.283 | 13 | 1.967 | 5 | 4.80 | 17 |
| 3.21 | 50 | 3.42 | 45 | 3.64 | 60 | 1.79 | 30 | 2.159 | 18 | 1.620 | 50 | 4.12 | 27 |
| 2.91 | 6 | 3.30 | 95 | 3.44 | 80 | 1.77 | 10 | 2.018 | 2 | 1.555 | 17 | 3.82 | 20 |
| 2.73 | 5 | 3.21 | 90 | 3.27 | 30 | 1.76 | 6 | 1.884 | 8 | | | 3.60 | 83 |
| 2.58 | 45 | 2.92 | 6 | 3.11 | 20 | 1.75 | 10 | 1.870 | 14 | | | 3.24 | 40 |
| 2.43 | 5 | 2.73 | 5 | 3.04 | 40 | 1.73 | 10 | 1.726 | 4 | | | 2.96 | 7 |
| 2.25 | 15 | 2.58 | 50 | 3.02 | 50 | 1.72 | 6 | 1.716 | 7 | | | 2.74 | 7 |
| 2.23 | 6 | 2.49 | 3 | 2.64 | 2 | 1.70 | 4 | 1.633 | 3 | | | 2.55 | 7 |
| 2.10 | 25 | 2.43 | 5 | 2.49 | 6 | 1.67 | 4 | 1.568 | 13 | | | 2.39 | 7 |
| 1.93 | 40 | 2.37 | 8 | 2.48 | 6 | 1.65 | 6 | | | | | 2.22 | 13 |
| 1.84 | 25 | 2.28 | 5 | 2.47 | 6 | 1.60 | 4 | | | | | 2.15 | 20 |
| 1.83 | 35 | 2.25 | 15 | 2.37 | 4 | 1.565 | 10 | | | | | 2.07 | 13 |
| 1.74 | 35 | 2.23 | 4 | 2.28 | 4 | 1.530 | 6 | | | | | 2.00 | 7 |
| 1.73 | 30 | 2.15 | 8 | 2.02 | 6 | 1.510 | 10 | | | | | 1.91 | 13 |
| 1.68 | 15 | 2.10 | 20 | 1.96 | 10 | 1.480 | 4 | | | | | 1.81 | 13 |
| | | 1.93 | 45 | 1.94 | 20 | 1.431 | 4 | | | | | 1.71 | 13 |
| | | 1.87 | 100 | | | | | | | | | 1.62 | 13 |
| | | 1.85 | 25 | | | | | | | | | 1.57 | 7 |
| | | 1.83 | 45 | | | | | | | | | 1.51 | 7 |
| | | 1.74 | 30 | | | | | | | | | | |
| | | 1.73 | 35 | | | | | | | | | | |
| | | 1.68 | 15 | | | | | | | | | | |

[1] Evaluated by paper trace, X-ray diffraction procedure.

ANTICARIOGENIC EFFECTIVENESS

The anticariogenic effectiveness of the zirconium-germanium-fluoride salts may be demonstrated by the dental caries experience of rats (standard experimental animals for anticariogenic studies). The effect of various compositions in reducing the solubility of dental enamel in acid is a reliable indicator of anticariogenicity. Enamel solubility characteristics of dental compositions can be determined by a number of tests well known in the art. The particular test for reduction in tooth enamel solubility described herein comprises a comparison of acid solubility of a given tooth before and after treatment with a given test composition. The said comparison is expressed as "ESR," that is, enamel solubility reduction.

Rat tooth ESR is determined in vivo as follows. The teeth of a group of suitably selected test rats are given single one-minute topical applications with solutions of various fluorides, and the animals are sacrificed twenty minutes thereafter. Each mandibular hemijaw is removed and the clinical crowns of each are decalcified in 0.2 N (pH 4) sodium acetate buffer for twenty minutes, and the decalcification solutions are analysed for phosphorus by a colorimetric method (Fisk and Subbarow, "The Colorimetric Determination of Phosphorus," Journal of Biological Chemistry, 66:375, 1925). Phosphorus liberation of the teeth topically treated with the various fluoride solutions is compared with that of teeth similarly treated with nonfluoride containing control solutions, and the result of such comparison is reported as a percentage reduction of enamel solubility (i.e., ESR).

Table IV reports percentage reduction values achieved in the rat tooth ESR test with topically applied aqueous solutions of the zirconium-germanium-fluoride salts of the present invention at a 1000 p.p.m. fluoride ion level. The high level of anticariogenic activity of the new compounds is clearly evidenced by the percentage reduction values shown below.

TABLE IV

| Compound | pH of solution | ESR mean percent reduction |
|---|---|---|
| $Zr(GeF_6)_2$ | 2.3 | 70.06 |
| $ZrOGeF_6$ | 2.5 | 70.83 |

Percentage reduction values for topically applied aqueous solutions or slurries of $Zr(GeF_6)_2$ and $ZrOGeF_6$ at various levels of concentration are shown in Table V. High levels of anticariogenic effectiveness were obtained at all levels tested.

TABLE V

| Fluoride compd. | Percent conc. | pH (nat'l) | ESR mean percent reduction |
|---|---|---|---|
| $Zr(GeF_6)_2$ | 2.0 | 1.6 | 71.7 |
| $Zr(GeF_6)_2$ | 4.0 | 1.5 | 82.1 |
| $Zr(GeF_6)_2$ | 6.0 | 1.4 | 77.6 |
| $Zr(GeF_6)_2$ | 8.0 | 1.3 | 88.1 |
| $Zr(GeF_6)_2$ | 12.0 | 1.2 | 94.9 |
| $Zr(GeF_6)_2$ | 16.0 | 1.1 | 95.5 |
| $Zr(GeF_6)_2$ | 24.0 | 1.0 | 90.7 |
| $ZrOGeF_6$ | 2.0 | 2.0 | 82.0 |
| $ZrOGeF_6$ | 4.0 | 1.9 | 83.7 |
| $ZrOGeF_6$ | 6.0 | 1.8 | 87.0 |
| $ZrOGeF_6$ | 8.0 | 1.7 | 79.1 |
| $ZrOGeF_6$ | 12.0 | 1.5 | 82.9 |
| $ZrOGeF_6$ | 16.0 | 1.3 | 91.6 |
| $ZrOGeF_6$ | 24.0 | 1.1 | 89.0 |

Tables VI–VIII report comparative ESR data achieved with the new zirconium-germanium-fluoride salts and several known fluoride-containing anticariogenic agents. In the studies reported in Table VI, the aqueous test solutions were prepared so that each was equivalent (on a fluoride ion basis) to an 8 percent $SnF_2$ solution. Likewise, in Table VII the aqueous solutions or slurries were all equivalent to a 24 percent $SnF_2$ solution, and in Table VIII the solutions or slurries were all equivalent to a 24 percent $SnZrF_6$ solution. In all cases the new zirconium-germanium-fluoride salts were at least as effective as the tested known anticariogenic compounds.

TABLE VI

| Fluoride compd. | Percent conc. | pH (nat'l) | ESR mean percent reduction |
|---|---|---|---|
| $SnF_2$ | 8.00 | 2.6 | 24.2 |
| $NaF$ | 4.29 | 6.9 | 16.3 |
| $Zr(GeF_6)_2$ | 3.95 | 1.4 | 81.5 |
| $ZrOGeF_6$ | 5.00 | 1.5 | 81.6 |
| $SnZrF_6$ | 5.51 | 2.1 | 26.5 |

TABLE VII

| Fluoride compd. | Percent conc. | pH (nat'l) | ESR mean percent reduction |
|---|---|---|---|
| $SnF_2$ | 24.00 | 2.3 | 46.7 |
| $NaF$ | 12.86 | 6.7 | 30.3 |
| $Zr(GeF_6)_2$ | 11.86 | 1.0 | 93.1 |
| $ZrOGeF_6$ | 15.00 | 1.7 | 84.3 |
| $SnZrF_6$ | 16.54 | 1.7 | 81.4 |

TABLE VIII

| Fluoride compd. | Percent conc. | pH (nat'l) | ESR mean percent reduction |
|---|---|---|---|
| $SnZrF_6$ | 24.00 | 1.5 | 76.3 |
| $Zr(GeF_6)_2$ | 17.20 | 1.0 | 97.5 |
| $ZrOGeF_6$ | 21.68 | 1.2 | 90.7 |
| $SnF_2$ | 34.83 | 2.1 | 58.8 |
| $NaF$ | 18.67 | 6.6 | 51.5 |

Table IX reports data illustrating duration of effectiveness of a single topical application of various fluoride-containing anticariogenic agents. A total of 120 rats were divided into five groups, and each group was divided into four subgroups. The animals in each group received a single one-minute topical treatment of the respective aqueous solution. Animals in the first subgroup were sacrificed twenty minutes after receiving the initial topical treatment. The other subgroups were sacrificed at the following intervals of time: two and one-half days; five days; and ten days. The topical solutions were equalized to the fluoride content of 8 percent $Zr(GeF_6)_2$. The hemijaws were prepared and the enamel solubilities determined as hereinbefore described. If a minimum desired reduction level of 50 percent is selected, the zirconium-germanium-fluorides would require reapplication only half as often as $SnF_2$ or $SnZrF_6$.

TABLE IX

| Fluoride compd. | Percent conc. | ESR mean percent reduction | | | |
|---|---|---|---|---|---|
| | | 20 min. | 2½ days | 5 days | 10 days |
| $SnF_2$ | 16.2 | 59.9 | 54.8 | 25.0 | 17.8 |
| $SnZrF_6$ | 11.2 | 62.0 | 58.9 | 23.5 | 23.8 |
| $ZrOGeF_6$ | 10.1 | 92.1 | 79.8 | 45.8 | 52.0 |
| $Zr(GeF_6)_2$ | 8 | 94.4 | 80.5 | 64.1 | 63.8 |

Table X shows data indicating that significant anticariogenic effectiveness is achieved even though the duration of the topical application is relatively short. Eight percent aqueous solutions of the compounds were applied for periods ranging from 15 seconds to several minutes. The enamel solubilities were determined by the rat tooth ESR test hereinbefore described.

TABLE X

| Fluoride compound | Conc. percent | Length of topical | ESR |
|---|---|---|---|
| $Zr(GeF_6)_2$ | 8 | 15 sec | 76.7 |
| $Zr(GeF_6)_2$ | 8 | 30 sec | 74.9 |
| $Zr(GeF_6)_2$ | 8 | 1 min | 89.3 |
| $Zr(GeF_6)_2$ | 8 | 2 min | 86.9 |
| $Zr(GeF_6)_2$ | 8 | 4 min | 89.8 |
| $ZrOGeF_6$ | 8 | 15 sec | 86.0 |
| $ZrOGeF_6$ | 8 | 30 sec | 93.4 |
| $ZrOGeF_6$ | 8 | 1 min | 90.0 |
| $ZrOGeF_6$ | 8 | 2 min | 93.3 |
| $ZrOGeF_6$ | 8 | 4 min | 97.1 |

The new zirconium-germanium-floride salts of the present invention also have outstanding utility as anticariogenic constituents of oral compositions for caries prophylaxis. In general, such compositions (which include topical solutions, prophylactic paste compositions, and dentifrice preparations) will contain from about 0.1 to about 50% of the zirconium-germanium-fluoride salts of the present invention. Oral compositions which are designed for relatively frequent use in the home (e.g., dentifrice and mouthwash preparations) typically contain lower levels of the salts of the present invention than do the prophylactic pastes or topical solutions. Dentifrice preparations preferably comprise from about 0.1 to about 0.5% zirconium-germanium-fluoride salts. Prophylactic paste compositions preferably comprise about 10 to 30% of the zirconium-germanium-fluoride salts of the present invention. Topical solutions incorporating the zirconium-germanium-fluoride salts of the present invention preferably comprise about 0.1 to about 50% of the salt, and preferably about 40 to 20% of the salts.

Dentifrice compositions containing the zirconium-germanium-fluoride salts constitute a preferred embodiment of this invention and may contain the usual dentifrice components, but preferably, ionically compatible adjuvants are used. For example, resinous abrasive materials including particulate condensation products of melamine and urea or formaldehyde and the like which do not form insoluble salts with fluoride ion or inactivate zirconium, germanium, and fluoride ions by adsorption can be used to advantage. Other abrasives which have proven practical in fluoride containing dentifrice compositions and which can be used herein include zirconium silicate, calcium pyrophosphate, insoluble metaphosphates and alumina. Mixtures of these abrasives can also be used.

The total amount of abrasive material in dentifrices of this invention can range from 0.5% to 95% by weight of the total composition. Preferably, toothpastes contain from 20% to 60% by weight and toothpowders contain from 60% to 95% by weight.

Toothpastes require a binder substance to impart desired texture properties. Natural gum binders such as gum tragacanth, gum karaya, gum arabic, etc. and seaweed derivatives such as Irish moss and alginates, and water soluble cellulose derivatives, such as hydroxyethyl-cellulose and sodium carboxylmethyl cellulose can be used for this purpose. Desirably those materials are employed which are most compatible with fluoride ion. Binders which have no ionic groups, such as hydroxyethyl cellulose are especially preferred. Improvements in texture can also be attained by including an additional material such as colloidal magnesium aluminum silicate.

Thickening agents in an amount of from 0.5% to 5.0% by weight can be used to form a satisfactory toothpaste.

Toothpastes conventionally contain sudsing agents. Suitable sudsing agents include, but are not limited to, water-soluble alkyl sulfates having from 8 to 18 carbon atoms in the alkyl radical, such as sodium lauryl sulfate, water-soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmitoyl tauride, and salts of fatty acid esters of isethionic acid.

Sudsing agents can be used in the compositions of this invention in an amount of from about 0.5% to about 5.0% by weight of the total composition.

It is also desirable to include some humectant material in a toothpaste to keep it from hardening. Materials commonly used for this purpose include glycerine, sorbitol and other polyhydric alcohols. The humectants can comprise up to 35% of the toothpaste composition.

data was obtained in the previously described manner. The results of these tests are given in Table XI. The sample dentifrices utilized as the anticariogenic active component mixtures of a fluoride-containing salt and an active-phosphate compound, for example, an ammonium salt of a condensation product of $NH_3$ and $P_4O_{10}$, e.g.,

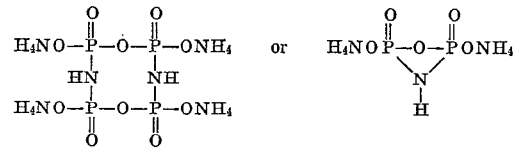

commercially available under the trade name "Victamide" from Victor Chemical Company, in the manner set forth and described in applicant's copending United States patent application, Dentifrice Preparation, Ser. No. 402,920, filed Oct. 9, 1964. As their cleaning and polishing components, the dentifrices utilized a critically defined zirconium silicate [$ZrSiO_4$], in accordance with applicant's copending United States patent application, Anticariogenic and Anti-Calculus Dentifrice Cleaning and Polishing Agent and Dentifrice Preparations Incorporating Same, Ser. No. 453,515, filed May 5, 1965.

The data reported in Table XI verify the high level of anticariogenicity obtained with dentifrice preparations embodying the zirconium-germanium-fluoride salts of the present invention.

TABLE XI.—ANTICARIOGENIC EFFECTIVENESS OF ZIRCONIUM-GERMANIUM-FLUORIDE SALTS

| Group No. | $ZrSiO_4$ | $ZrOGeF_6$ | $Zr(GeF_6)_2$ | Victamide | Water | Glycerin | Sorbitol 70% aqueous | Sudsers | Binders |
|---|---|---|---|---|---|---|---|---|---|
| 1 (control) | | | | | | | | | |
| 2 | 48 | 0.26 | | 10 | 18 | 10 | 10 | 1.2 | 2.0 |
| 3 | 48 | 0.26 | | 15 | 18 | 10 | 10 | 1.2 | 2.0 |
| 4 | 48 | 0.26 | | 10 | 18 | 10 | 10 | 1.2 | 2.0 |
| 5 | 48 | 0.26 | | 15 | 18 | 10 | 10 | 1.2 | 2.0 |
| 6 | 48 | 0.26 | | 10 | 18 | 10 | 10 | 1.2 | 2.0 |
| 7 | 48 | 0.26 | | 15 | 18 | 10 | 10 | 1.2 | 2.0 |
| 8 | 48 | | 0.18 | 10 | 18 | 10 | 10 | 1.2 | 2.0 |
| 9 | 48 | | 0.18 | 15 | 18 | 10 | 10 | 1.2 | 2.0 |
| 10 | 48 | | 0.18 | 10 | 18 | 10 | 10 | 1.2 | 2.0 |
| 11 | 48 | | 0.18 | 15 | 18 | 10 | 10 | 1.2 | 2.0 |
| 12 | 48 | | 0.18 | 10 | 18 | 10 | 10 | 1.2 | 2.0 |
| 13 | 48 | | 0.18 | 15 | 18 | 10 | 10 | 1.2 | 2.0 |

| Group No. | M-$HPO_3$ | $H_3PO_4$ | $Zr(PO_3)_4$ | $Zr P_2O_7$ | $Zr_3(PO_4)_4$ | $KHC_8H_4O_4$ | Brushing pH | No. of Teeth | Mean % Red |
|---|---|---|---|---|---|---|---|---|---|
| 1 (control) | | | | | | | 7.0 | 10 | |
| 2 | 1.0 | 0.2 | 1.0 | | | 2.0 | 4.0 | 10 | 71.0 |
| 3 | 1.0 | | 1.0 | | | 2.0 | 3.85 | 9 | 63.5 |
| 4 | 1.0 | | | 1.0 | | 2.0 | 3.9 | 10 | 66.3 |
| 5 | 1.0 | | | 1.0 | | 2.0 | 4.2 | 10 | 62.2 |
| 6 | 1.0 | | | | 1.0 | 2.0 | 4.0 | 9 | 71.1 |
| 7 | 1.0 | | | | 1.0 | 2.0 | 4.2 | 8 | 73.8 |
| 8 | 1.0 | | 1.0 | | | 2.0 | 4.1 | 10 | 60.0 |
| 9 | 1.0 | | 1.0 | | | 2.0 | 4.0 | 9 | 68.7 |
| 10 | 1.0 | | | 1.0 | | 2.0 | 4.0 | 10 | 66.0 |
| 11 | 1.0 | | | 1.0 | | 2.0 | 3.9 | 10 | 66.5 |
| 12 | 1.0 | | | | 1.0 | 2.0 | 3.9 | 10 | 63.1 |
| 13 | 1.0 | | | | 1.0 | 2.0 | 4.0 | 9 | 75.8 |

Flavoring materials may be included in toothpaste formulations including small amounts of oils of wintergreen and peppermint and sweetening agents such as saccharine, dextrose and levulose.

The efficacy of toothpaste compositions in accordance with this invention can be seen from the following studies.

A suitable number of rats were divided into thirteen equal groups, and the teeth of each rat were brushed five times within a three-hour period with a sample dentifrice preparation. The rats were sacrificed thereafter, and ESR data was obtained in the previously described manner.

When incorporated in dentifrice preparations, the novel zirconium-germanium-fluoride salts of the present invention are comparable in effectiveness to other known anticariogenic agents (such as, for example, $SnF_2$). Table XII records rat ESR data obtained in a brushing study, carried out according to the previously described procedure in which dentifrices comprising $SnF_2$ and Victamide are utilized. The data of Table XII verify the high level of anticariogenic effectiveness of dentifrice preparations embodying the salts of the present invention.

TABLE XII.—ANTICARIOGENIC EFFECTIVENESS OF VARIOUS FLUORIDE CONTAINING DENTIFRICE PREPARATIONS

| $ZrSiO_4$ | $SnF_2$ | $ZrOGeF_6$ | Victamide | Water | Glycerin | Sorbitol 70% aqueous | Sudsers | Binders | M-$HPO_3$ | $H_3PO_4$ | $Sn_2P_2O_7$ | $KHC_8H_4O_4$ | Brushing pH | No. of teeth | Mean percent Red |
|---|---|---|---|---|---|---|---|---|---|---|---|---|---|---|---|
| 47 | 0.4 | | 10 | 10 | 10 | 10 | 1.5 | 2.3 | 1.0 | 0.4 | 1.0 | 2.0 | 7.0 | 9 | |
| 47 | 0.4 | | 12.5 | 10 | 10 | 10 | 1.5 | 2.3 | 1.0 | 0.5 | 1.0 | 2.0 | 4.0 | 10 | 77.9 |
| 47 | 0.4 | | 15 | 10 | 10 | 10 | 1.5 | 2.3 | 1.0 | 0.6 | 1.0 | 2.0 | 4.0 | 10 | 72.8 |
| 48 | | 0.26 | 10 | 22 | 10 | 10 | 1.2 | 2.0 | 1.0 | 0.2 | | | 3.95 | 10 | 77.3 |
| 48 | | 0.26 | 10 | 22 | 10 | 10 | 1.2 | 2.0 | 1.0 | 0.2 | | | 4.5 | 9 | 70.1 |
| 48 | | 0.26 | 10 | 22 | 10 | 10 | 1.2 | 2.0 | 1.0 | 0.2 | | | 4.0 | 10 | 65.7 |
| 48 | | 0.26 | 10 | 22 | 10 | 10 | 1.2 | 2.0 | 1.0 | 0.2 | | | 5.0 | 10 | 70.4 |

The following examples provide exemplary dentifrice formulations comprising the zirconium-germanium-fluoride salts of the present invention.

Example III

A toothpaste composition is prepared by conventional methods having the following composition:

| | Percent by weight |
|---|---|
| Zirconium hexafluorogermanate | 0.22 |
| Zirconium silicate | 44.18 |
| Victamide | 5.01 |
| Distilled water | 14.09 |
| Glycerin | 7.59 |
| Sorbital (70% aqueous solution) | 9.21 |
| Sodium coconut monoglyceride sulfonate | 0.87 |
| Sodium lauryl sulfate | 0.87 |
| Veegum (magnesium aluminum silicate) | 0.33 |
| Sodium carboxymethyl cellulose | 1.35 |
| Meta-phosphoric acid | 11.38 |
| Potassium acid phthalate | 2.00 |
| Flavoring agents | 1.00 |
| Coloring agents | 1.08 |
| Saccharin | 0.82 |
| | 100.00 |

When diluted with water and brushed upon the teeth in the conventional manner, this composition yields substantial reductions in carries incidence.

Example IV

Another toothpaste composition is prepared as in Example III, but containing zirconyl hexafluorogermanate in place of zirconium hexafluorogermanate. This composition provides an effective means for caries prophylaxis when used in the conventional manner.

The new zirconium-germanium-fluoride compounds are useful as anticariogenic constituents when incorporated with a cleaning and polishing agent (e.g., lava pumice or zirconium silicate) to form a prophylactic paste adapted for application once or twice a year by a dentist or dental hygienist. Preferred prophylactic pastes embodying zirconium silicate are set forth and described in applicant's copending United States patent application entitled Prophylactic Dental Paste Compositions Comprising Zirconium Silicate, Ser. No. 314,602, filed Oct. 8, 1963. Table XIII contains representative ESR results obtained through the use of various prophylactic paste compositions. A suitable number of test rats were divided into groups and each group was given a 15-second prophylaxis with one of the compositions. Twenty minutes following treatment, the animals were sacrificed, and enamel solubilities were determined in the usual manner. The data of Table XIII illustrate the high level of anticariogenic effectiveness obtained with prophylactic paste compositions embodying the salts of the present invention.

TABLE XIII

| Polishing agent | Percent | Prophylactic paste constituents Fluoride | Percent | Water percent | ESR data, percent mean reduction |
|---|---|---|---|---|---|
| Lava pumice | 67.0 | | | 33.0 | |
| $ZrSiO_4$ | 82.0 | $ZrOGeF_6$ | 2.0 | 16.0 | 65.6 |
| $ZrSiO_4$ | 76.0 | $ZrOGeF_6$ | 8.0 | 16.0 | 87.4 |
| $ZrSiO_4$ | 84.0 | $Zr(GeF_6)_2$ | 2.0 | 14.0 | 60.2 |
| $ZrSiO_4$ | 78.0 | $Zr(GeF_6)_2$ | 8.0 | 14.0 | 91.2 |
| $ZrSiO_4$ | 55.0 | $SnZrF_6$ | 30.0 | 15.0 | 78.5 |
| Lava pumice | 61.1 | $SnF_2$ | 8.9 | 30.0 | 66.8 |

The anticariogenic effectiveness of the novel zirconium-germanium-fluoride salts has also been verified in human clinical studies. A total of approximately 150 children between the ages of 6–15 years were divided in accordance with past dental caries experience into three balanced groups. Each member of each group received a thorough dental prophylaxis before the clinical study was begun. Each member of each group received treatment with a topical solution and was examined after six months. The children in Group I received an 8% solution of $Zr(GeF_6)_2$; Group II received a 12.6% solution of $ZrOGeF_6$; and Group III received a 0.9% NaCl solution. The increments in the number of decayed, missing, and filled teeth ($\Delta$DMFT) and the increments in the number of decayed, missing, and filled surfaces ($\Delta$DMFS) were recorded. The percentage reduction in caries incidence was established by comparison with the control group (Group III). The results of this study are presented in Table XIV.

TABLE XIV.—HUMAN CLINICAL STUDIES

| Group | No. of Subjects | Fluoride compound | Conc., percent | DMFT | DMFS | Percent Red. Teeth | Percent Red. Surfaces |
|---|---|---|---|---|---|---|---|
| I | 50 | $Zr(GeF_6)_2$ | 8.0 | 0.40 | 1.20 | 76.8 | 58.4 |
| II | 49 | $ZrOGeF_6$ | 12.6 | 0.43 | 0.63 | 75.9 | 78.2 |
| III | 43 | Control | | 1.72 | 2.89 | | |

The results of the human clinical studies, as reported in Table XIV, clearly establish the anticariogenic effectiveness of the zirconium-germanium-fluorides of the present invention.

As previously noted, the new zirconium-germanium-fluoride salts of the present invention are especially useful when incorporated in oral compositions for caries prophylaxis.

ANIMAL TOXICITY

In addition to exhibiting a high level of anticariogenic effectiveness, the zirconium-germanium-fluoride salts of the present invention are of low toxicity comparing quite favorably in this regard with other anticariogenic fluorides, as shown by the following experimental studies.

The toxicity of the zirconium-germanium-fluoride salts has been determined in mice (standard experimental animals for this purpose), and acute toxicity data are shown in Table XV, with corresponding values for NaF included for comparative purposes. The toxicity is expressed in terms of an $LD_{50}$, which is the lethal dose for 50% of the animals treated. The $LD_{50}$ is expressed both in milligrams of fluoride per kilogram of body weight and in milligrams of compound per kilogram of body weight. The data reveals that the test mice could tolerate significantly greater amounts of exempary zirconium-germanium-fluoride salts than of sodium fluoride.

TABLE XV.—ACUTE TOXICITY

| Compound | LD$_{50}$ | |
|---|---|---|
| | Mg. F/kg. | Mg.cpd./kg |
| NaF | 36 | 80 |
| Zr(GeF$_6$)$_2$ | 75 | 153 |
| ZrOGeF$_6$ | 75 | 194 |

Rat studies further reveal that zirconium-germanium-fluoride salts, when topically applied, do not damage the gingival tissue of the test animals. Groups of weanling rats were given topical applications of various fluoride compounds, and the gingival tissues were examined after 24 hours. The results indicate that the exemplary zirconium-germanium-fluoride salts are comparable or superior to known fluorides (e.g., NaF, SnF$_2$, or SnZrF$_6$).

The particular zirconium-germanium-fluoride salts set forth and described hereinbefore are believed to be representative of a class of theoretically obtainable zirconium-germanium-fluoride salts. Thus, it is believed that other zirconium-germanium-fluoride salts may be prepared and such other salts would be expected to exhibit the same anticariogenic utility as the specific salts disclosed herein.

While the present invention has been described herein with reference to certain exemplary embodiments thereof, it should be understood that various changes, modifications, and alterations may be effected in the materials utilized, in the proportions of materials, and in the manners of formulation without departing from the spirit and the scope of the present invention, as defined in the appended claims.

What is claimed is:

1. An anticariogenic salt comprising a member selected from the group consisting of zirconium hexafluorogermanate [Zr(GeF$_6$)$_2$] and zirconyl hexafluorogermanate [ZrOGeF$_6$].

2. An anticariogenic salt, as claimed in claim 1, wherein the member is zirconium hexafluorogermanate

[Zr(GeF$_6$)$_2$]

3. An anticariogenic salt, as claimed in claim 1 wherein the member is zirconyl hexafluorogermanate

[ZrOGeF$_6$]

References Cited

Gebala et al.: "Journal of Inorganic and Nuclear Chemistry," vol. 29, September 1967, pp. 2301–2305.

Johnson: "Chemical Reviews," vol. 51, 1952, p. 462 of Interest.

Ryss: "The Chemistry of Fluorine and Its Inorganic Compounds," Part 1, U.S. Atomic Energy Commission Report AEC–tr–3927 (Pt. 1), 1960, Oak Ridge, Tenn., pp. 346–349.

HERBERT T. CARTER, Primary Examiner.

U.S. Cl. X.R.

23—88; 167—93